July 17, 1951  A. D. ROBBINS  2,560,779
DRIVING DIFFERENTIAL
Filed Oct. 6, 1948
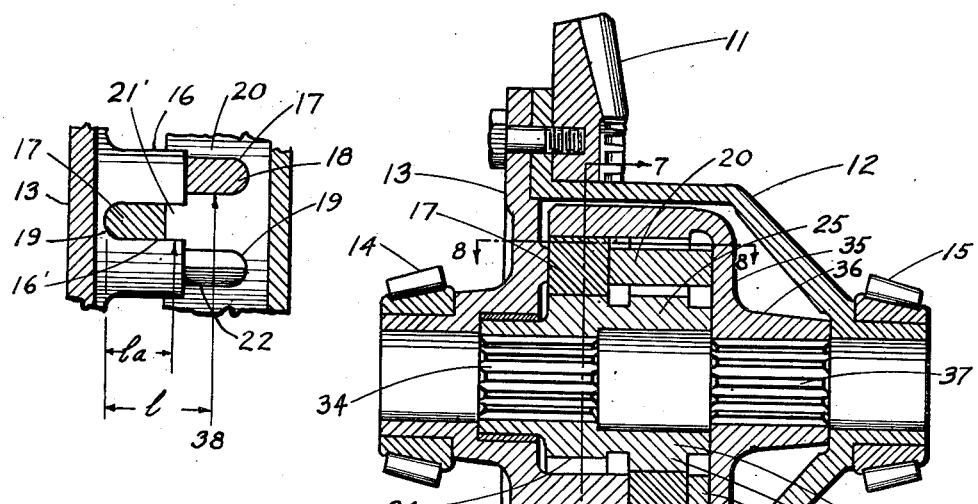
FIG. 3
FIG. 1
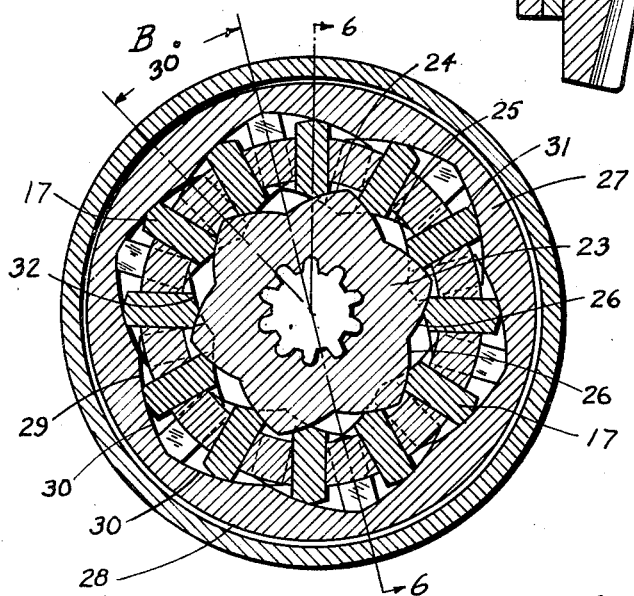
FIG. 2
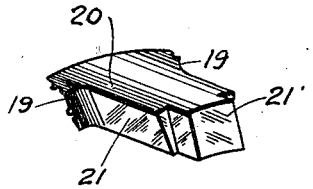
FIG. 4
FIG. 5
INVENTOR.
Azor D. Robbins Patented July 17, 1951

2,560,779

UNITED STATES PATENT OFFICE 2,560,779

DRIVING DIFFERENTIAL

Azor D. Robbins, Hempstead, N. Y.

Application October 6, 1948, Serial No. 53,030

3 Claims. (Cl. 74—650)

This invention relates to differential devices as used in the driving axles of automobile vehicles for the purpose of dividing the power applied to the driving wheels.

One of the objects of this invention is to provide a differential which will divide the driving power in a ratio which will prevent either wheel from spinning when the road surface at one wheel provides poor traction, as when on ice or mud. Another object is to provide a device of this character which will have more torque capacity for a given over-all or outside diameter than prior devices of this type. A further object is to provide a durable differential of this type which will be inexpensive to manufacture and will fit within the space provided for gear type differentials now in common use.

Other objects of the invention will appear as it is described in further detail in connection with the accompanying drawings wherein:

Figure 1 is a section through the central axis of the device on line 6—6 of Fig. 2. Fig. 2 is a section through line 7—7 of Fig. 1. Fig. 3 is a partial section through line 8—8 of Fig. 1. Fig. 4 shows a detail of a driving plunger. Fig. 5 is a fragmentary view showing part of a driving member.

Referring to Fig. 1 the driving bevel gear 11 is mounted on a housing which comprises two halves 12 and 13. Each of the members 12 and 13 are journaled in antifriction bearings 14 and 15 which may be supported in the usual axle housing not shown. The housing member 13 carries axially projecting fingers 16 which form an annular driving cage. In the spaces between the fingers 16 are mounted plungers 17 one of which is shown at Fig. 4. The plungers may be substantially rectangular in cross section but preferably have a radius 18 at one end of the section which therefore makes a section in the form of a broad D, with the radius 18 adapted to fit into the radius 19 formed at the base of the fingers 16. The radius 19 is preferred in constuction to avoid sharp corners at the base of the fingers and thereby reduce stress concentration which would occur if the plungers 17 were truly rectangular in section.

A secondary cage 20 is provided with a number of projecting fingers 21 the ends of which have a narrow part 21' adapted to fit closely into the slots 16' of cage 13. A second series of plungers 17 fit within the slots 22 of said secondary cage. All the plungers fit closely but free enough to slide radially in the slots of each cage.

Enclosed within the fingers of the cages 13 and 20 is a driven member 23 comprising a cluster of externally faced cams 24 and 25. In the preferred form shown, the cams are in two planes or series, one of the planes comprising six cams 24 and the other of six cams 25. Each cam 24 or 25 is formed with opposed spiral surfaces 26. Said surfaces are preferably in the form of an archimedian spiral and each surface extends circumferentially 30° around the center to meet an opposed spiral surface. Each of the cams 24 in their plane are offset 30° in relation to the cams 25 in the other plane, as shown at B in Fig. 2.

Enclosing the projecting fingers 16 and 21 is another driven member 27 which has a cylindrical outer portion 28 provided with internally faced cams 29. The cams of this member are formed in a continuous profile extending over the space occupied axially by cams 24 and 25, as shown in Fig. 1 and Fig. 2. The internal cams 29 have spiral surfaces 30 which form cams equal in radial height to cams 24 and 25. The plungers 17 have arcuate surfaces 31 at their outer ends adapted to slide on the surfaces of cams 29. The inner ends of said plungers have surfaces 32 adapted to slide against the surfaces 26 of cams 24 and 25. The length of said plungers is such that they fit closely, but movably, between said internal and external cams.

The driven member 23 has a splined opening 34 to receive the usual axle shaft (not shown). The driven member 27 is formed with a web 35 and a hub 36. The hub 36 also has a splined opening 37 to receive an axle shaft.

It will be seen that the whole assembly, as shown, can rotate in the bearings 14 and 15 and that power applied to gear 11 will, through the driving cages, carry the plungers 17 against the cams, normally driving both driven members at the same speed as the gear and housing. If, however, one of the driven members is held stationary, and the housing rotated, the plungers will move in and out over the surfaces of the stationary cams, forcing the other cam member to turn in the same direction but at twice the speed of the housing. Due to friction a larger percentage of the driving force will be applied to the stationary cam and a smaller percentage to the moving cam. Therefore, unless there is considerable difference between the tractive resistance, or road adhesion, at the driving wheels of the vehicle, both cams, and consequently both driving wheels will be turned at the same speed.

Prior to this invention cam type differentials have been made with two rows of plungers engaging a wide outer cam and the inner cam having two rows of offset cams as herein described and no claims are made for this part of the device. In prior devices of this character it has been found difficult to provide a cage for rotating the plungers, which would be inexpensive to manufacture, provide room for wide plungers and have the necessary strength to transmit heavy loads which would compare with and which would fit within the axle housing which now houses the bevel type differential in common use.

To understand the advantages of the present invention it can be shown that in the prior art as shown by the Ford Patent 1,336,950 and the Robbins Patent 1,836,684 cages have been made with rectangular holes. These rectangular holes present a difficult and expensive machining operation. Other art as shown by the Robbins Patent 1,857,978 shows a cage with round holes and partly cylindrical plungers. Since the cylindrical plungers have to be made with flat surfaces to engage means to prevent them from rotating in the openings, considerable surface is lost at the point of engagement with the cams. Another type of cage is shown in a patent to Robbins 2,440,975 with a series of fingers and pairs of plungers in each of the slots between the fingers. While this is inexpensive it is limited in capacity in relation to its size as the fingers must be limited in length to prevent harmful deflection when driving the plungers engaged by the tip of the fingers.

It should be pointed out that in differentials of this type, as the cams rotate in relation to each other and the housing, there are positions in which the driving cage drives the device through six of the plungers that is, each alternate plunger in one series of twelve which operate against the series of cams 25. During this part of the operation, the driving reaction against one of the plungers 17 will be along the line shown at 38. If the cage was a single piece, as shown in prior art, with the fingers long enough to drive along line 38, there would be, at full load, considerable deflection of said fingers since each alternate one or only six of them would be driving. By dividing the cage into two sections (13 and 20) and interlocking the tips of the fingers so that the deflection and load of one is communicated to the next, all twelve fingers of cage 13 participate in the driving action when the second series of plungers 17 are operating to drive cams 25. In this connection it should be pointed out in calculating the deflection of the fingers under load each may be considered as a cantilever and the formula for deflection is $$\frac{Wl^3}{3EI}$$

$l$ being the length of the cantilever shown as $l$ in Fig. 3. Since $l$ is raised to the third power in the formula, it is apparent that the considerable reduction in the length of the cantilever as shown at $la$ will greatly reduce both deflection and stress in these members and that by using a cage which is divided into two pieces the fingers 16 of cage 13 are supported and plungers 17, 18 having a relatively wide dimension, extending in the axial direction of the device, and presenting relatively long wearing surfaces in contact with the cams, may be used without overstressing the fingers in driving the plungers and cams.

While the invention has been described specifically in connection with drawings referred to, it is to be limited save as defined in the appended claims.

I claim as my invention:

1. A driving differential comprising a primary driving cage having axially extending fingers, a secondary driving cage having fingers engaged in the spaces between the fingers of the first named cage, an annular driven member encompassing said cages and having a series of internal cams, a second driven member within said cages and having a series of external cams arranged in two planes and plungers carried between the fingers of each cage and operatively engaging said cams.

2. A driving differential comprising a primary driving cage having axially extending fingers, a secondary cage having driving engagement with the first named cage, an annular driven member encompassing said cages and having a series of internal cams, a second driven member within said cages and having a series of external cams arranged in two planes, and plungers carried in spaced openings in each cage and said plungers operatively engaging said cams.

3. A driving differential comprising a primary driving cage having axially extending fingers, a secondary cage having driving engagement with the first named cage, an annular driven member encompassing said cages and having a series of internal cams, a second driven member within said cages and having a series of external cams arranged in two planes, plungers carried between the fingers of each cage, the spaces between said fingers formed with a radius at the base of said fingers, said plungers having a D shaped section and the radius of said D section fitting into the radius at the base of said fingers.

AZOR D. ROBBINS.

REFERENCES CITED

The following references are of record in the file of this patent:

UNITED STATES PATENTS

| Number | Name | Date |
|---|---|---|
| 1,336,950 | Ford | Apr. 13, 1920 |
| 1,462,204 | Tobis et al. | July 17, 1923 |
| 1,857,978 | Robbins | May 10, 1932 |
| 2,440,975 | Robbins | May 4, 1948 |

FOREIGN PATENTS

| Number | Country | Date |
|---|---|---|
| 537,974 | Great Britain | July 16, 1941 |